Dec. 3, 1929.   W. H. SAUVAGE   1,738,395
AIR BRAKE SYSTEM
Filed Feb. 24, 1928
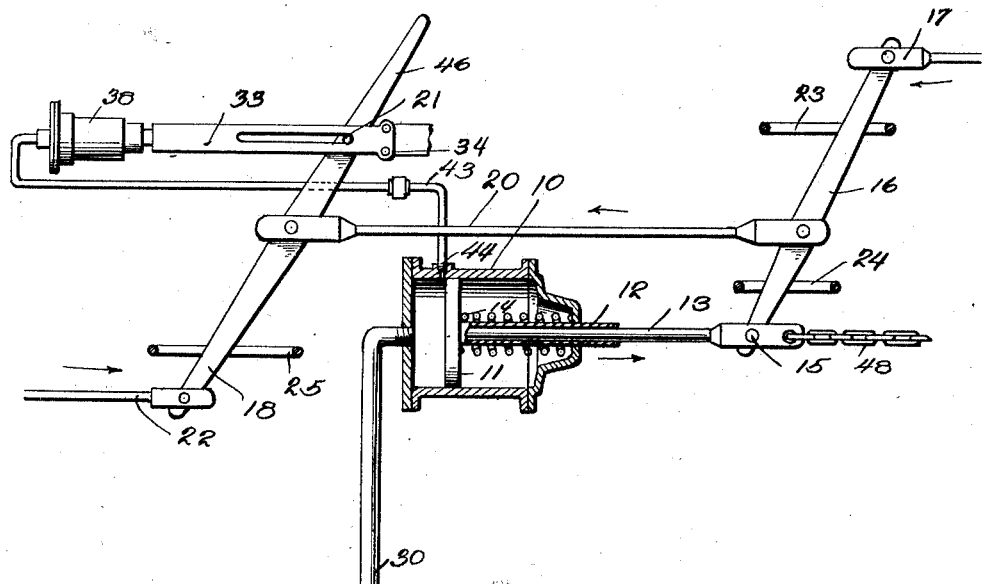
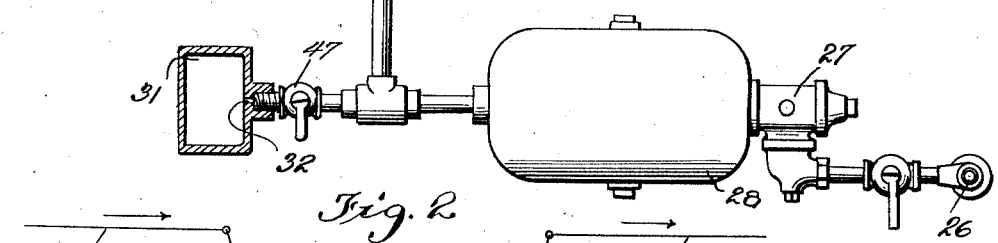
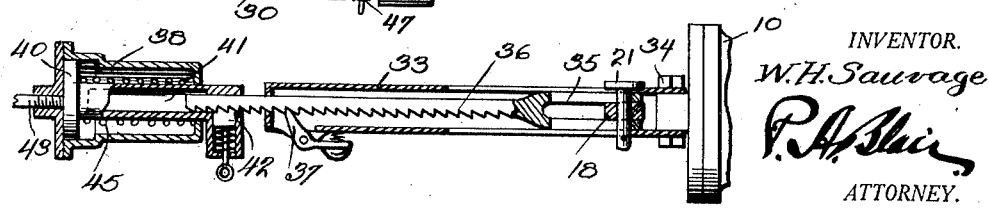
INVENTOR.
W. H. Sauvage
ATTORNEY.

Patented Dec. 3, 1929

1,738,395

UNITED STATES PATENT OFFICE

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE

AIR-BRAKE SYSTEM

Application filed February 24, 1928. Serial No. 257,280.

This invention relates to improvements in air brake systems and more particularly to features of air control for obtaining more efficient, uniform and desirable braking action.

As is well known to those familiar with the art, the air brake cylinder piston now in standard use has, when the brakes are properly regulated, a normal piston travel of approximately seven or eight inches, depending largely upon the movement of the car and its loading, but inasmuch as very few brakes are in properly regulated condition, in fact statistics show that only about ten per cent are correctly regulated after the cars have been in active use for a few hours, the piston has an irregular travel. If abnormally long a reduced braking action results, or if abnormally short, such piston travel is very undesirable because of high brake cylinder pressure equalization resulting in stuck brakes, flat and cracked wheels, break-in-two's, etc. Yet, a short piston travel with these objections eliminated and proper equalization would be highly desirable, inasmuch as a quicker and more efficient braking action is obtainable, the brakes throughout the entire train will operate at a much more uniform rate, and brake shoe clearance would be correspondingly reduced thereby lessening the possibility of over-heated wheels, broken brake shoes and brake beams, and consequent derailment, etc.

It is accordingly one of the objects of the present invention to provide an air brake system which will permit a relatively short normal piston travel with proper brake shoe clearance and without shocks to the wheels or brake shoes, brake beams or any other parts of the rigging. Therefore in the specification and claims the term "short piston travel" is to be interpreted as being approximately one-half present standard piston travel or about three and a half or four inches.

A further object is to provide such a mechanism whereby the piston travel is reduced approximately half, thus prolonging the life and wear of piston packing rings and other moving parts.

A further object is to provide such a system adapted to reduce or minimize all shocks to the train and equalize the time element in applying and in releasing the brakes throughout the train.

A further object is to provide an attachment for standard equipment now in use for accomplishing the above objects at a minimum of expense and without material substitution, alteration or expense or additions to such equipment.

A further object is to provide a mechanism of the above general character which will permit of a greatly reduced brake shoe clearance, thus preventing the insertion of new shoes only by necessitating the full release of the brake rigging and its subsequent regulation, as for example, by means of the manually actuated regulators shown in my Patent, No. 1,612,781, dated December 28, 1926, or any desired automatic regulator could be used if desired.

Other objects will be in part obvious from the annexed drawings and in part hereinafter indicated in connection therewith by the following analysis of the invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings, like characters of reference denote corresponding parts throughout all of the view, of which—

Fig. 1 shows semi-diagrammatically and partially in section a plan view of such parts of the brake rigging in applied position as is considered necessary to fully understand the same;

Fig. 2 is a similar view showing a modified arrangement; and

Fig. 3 is a detail sectional view of one type of regulator.

In these drawings, the numeral 10 indicates an air brake cylinder of standard construction provided with a piston 11 and preferably a two-part telescoping piston rod 12 and 13. An internal spring 14 is adapted to restore the piston 11 to its normal release position. The push rod 13 is connected at 15 with one end of a live cylinder lever 16, the opposite end of which lever is pivotally connected to a pull rod 17 leading to one of the truck brake riggings and its regulator if desired. At the opposite end of the cylinder, there is provided a floating or dead lever 18 connected with the live lever by a tie rod 20, whereby motion is transmitted from the cylinder to cause a swinging action of the dead lever about its adjustable support 21, thereby to actuate a pull rod 22 connected with the opposite truck brake rigging and regulator. All this construction is now of standard well known type, and further description is considered unnecessary.

The cylinder levers 16 and 18 are supported by means of brackets 23, 24 and 25 as and for the purpose set forth in my above mentioned patent, the primary object of this construction being to determine the normal angularity of the cylinder levers 16 and 18 when in their positions of full release and to prevent the regulating actuating movement on one truck being transmitted to the truck brake rigging at the opposite end of the car.

The air brake piston is actuated when the pressure in the train pipe indicated at 26 is reduced. This variation in pressure affects a triple valve indicated at 27 allowing the expansion of air from reservoir 28 thru connecting pipe 30 to the cylinder 10. The connecting pipe, however, is provided with an expansion reservoir 31 and an intervening restricted port opening 32 which performs two functions, that is, when in restricted position, it of course eliminates the shock in the cylinder, and further the expansion of air from the brake cylinder into the expansion chamber permits a more gradual equalization of pressure after the main rush of air from the reservoir 28 to the cylinder, thus avoiding all shock and break-in-two's in a car of trains so equipped, and also prevents wheels locking due to the high cylinder pressure obtained without expansion chamber 31.

As above explained, foundation brake gear when properly regulated, either automatically or manually, should have approximately a brake shoe clearance of one-fourth to three-eighths of an inch, but by reason of the leverage and intervening parts, this necessitates a normal proportional piston travel of only approximately four inches, assuming there being no other change made in the foundation brake gear.

As this short piston travel is undesirable in present day equipment for reasons above set forth the equalizing or expansion reservoir obviates these difficulties, for with a ten pound reduction in the train pipe and seventy pound auxiliary reservoir pressure, the same effective pressure may be obtained on the piston on a four inch travel by using the expansion reservoir 31 as would other wise occur in a normal seven or eight inch piston travel with standard equipment, and the time element required to develop and release this pressure will be approximately the same. Without some provision for the power brake mechanism which will permit a by-passing of a portion of the air from the auxiliary reservoir, excessive cylinder pressure would be developed with short piston travel and resulting in the serious objections noted above. While the consumption of air is the same in both situations, the short piston travel eliminates the shocks throughout the cars and trains, reduces the chances of broken brake shoes and beams, materially saves the wear and tear upon the cars, and avoids skidding of the wheels.

The present construction is particularly advantageous and beneficial where emergency actions take place, and the major portion of the shock to the foundation brake gear and the car due to such emergency action is entirely eliminated. The high peak brake cylinder pressure will be obtained in emergency with an almost immediate drop to normal pressure to the expansion reservoir by reason of the restricted opening 32, which gradually reduces the cylinder pressure after the first high emergency rush of air down to its normal safe braking application pressure.

In order that proper and predetermined brake shoe clearance may be had at all times, there is provided any desired form of regulating means either on each truck or such as indicated at 33, for the floating point of support 21 of the dead lever 18. It is preferred, however, to use a regulator of that general type illustrated in Fig. 3 of the drawings, which will be either or both automatic or manual in its operation. This regulator comprises the main body casing 33 supported from any relatively fixed part of the car, such as a transverse beam or draft sill in Fig. 1, or the rear of the air brake cylinder in Figs. 2 and 3. This may be secured in any desired manner as by means of bolts 34.

The lever 18 is mounted in a longitudinal slot 35 in a ratchet bar 36 which is normally held against movement in one direction as by means of spring actuated pawl 37. At the end of this bar is mounted a cylinder 38 having a relatively fixed position with respect to the car body and internally provided with a piston head 40 and telescoping piston rod 41 having a spring actuated pawl 42 cooperating with the same ratchet bar 36. A pipe 43 is interposed between the head of this cylinder 38 and the air brake cylinder 10, and preferably enters the latter at the point 44 which is approximately four or five inches from the cylinder head. The purpose of this construction should be apparent, but it may be briefly stated that whenever excess travel of the piston 11 occurs, that is, over this predetermined normal short travel of four inches, this port 44 is uncovered thereby allowing air to flow into the cylinder 38 and force out the piston 40, together with the pawl 42 so that it clicks over one tooth of the ratchet 36. When the brakes are released, and the piston 11 returns to normal position, pressure is relieved and this piston 40 is urged relatively towards the left by reason of the spring 45, thereby moving the rod 36 also relatively towards the left a distance of one tooth.

This shifting movement of the point 21 of course reacts thru the entire brake rigging automatically to bring the brake shoes again to a position of predetermined clearance. As further wear takes place, this operation is automatically repeated from time to time. However, it is unnecessary to depend upon this automatic actuation, for the inspector by grasping the handle 46 may move the pin 21 along the slot 35, which is proportional to normal brake shoe clearance, and if any excess movement exists in the brake rigging, then the rod 36 is carried further towards the left one or more notches past the manually releasable pawls 37 and 42, thereby permanently to take up and hold any excess piston travel movement. The lever 18 will be restored to normal position under the action of gravity upon the remaining parts of the brake rigging and drop back the distance of the lost motion slot 35.

In both forms, there is preferably provided a cut-out cock 47 whereby the auxiliary expansion reservoir 31 may be disconnected from the brake rigging when desired. Likewise, it may be desirable to attach a chain 48 to the live lever 16 to permit the actuation of the brakes by hand power in any desired manner.

It is believed to be unnecessary to go into a statement of operation of the present device other than to note that on application of the air brakes by reduction in the train line pressure, the air from the auxiliary reservoir 28 passes thru the pipe 30 to the air brake cylinder 10 to force out the piston 11 and apply the brakes. A portion of this air, however, is by-passed in the present case to the expansion reservoir during or after the first rush of air to the cylinder by reason of the restricted opening 32. The cylinder piston moves only approximately four inches, or half of its usual distance. By reason of the reduced brake shoe clearance, this movement brings the brake shoes instantly into engagement with the peripheries of the wheels without shock or damage to either shoes or wheels, and the action takes place uniformly and simultaneously on all of the cars of the train so equipped. The excess air pressure expands in the reservoir 31 thereby eliminating excessive braking power and the usual resulting slid flat wheels.

While the advantages of short piston travel may have heretofore been appreciated, as well as the advantages of using an auxiliary expansion reservoir under different car loadings, no case is known where these features have been successfully combined in a reliable, efficient, practical and foolproof mechanism. For instance, if it were attempted to regulate piston travel manually, and such regulation is included, very shortly there will develop a condition of long piston travel due to the fact that the brake shoes have been worn down, whereupon the inspector is very likely to remove the worn out shoes and jam in new brake shoes without first restoring the entire brake rigging to full release position. Such tendencies are common among railway employees, and of course such action immediately results in abnormally short piston travel with the usual disastrous consequences. By using an automatic regulator, however, the human factor is eliminated, and the piston is automatically maintained at four inch travel with quarter inch brake shoe clearance, thereby making the replacement of worn brake shoes impossible without the full release of the brake regulator mechanism.

In Fig. 2, there is illustrated a further advantage of the present arrangement, namely, the positioning of the connected pivot points of the tie rod 20 in the middle of the levers 16 and 18 instead of the two to one ratio shown in Fig. 1. In other words, the parts A and B are equal to the parts C and D respectively. By such construction, the leverages using the fundamentals of the present power system and employing the same volume of air and the same pressure as now used, develops a hundred per cent increase in power. The same volume of air is used whether the car is light or loaded, and the time element in applying the brakes and releasing the same synchronizes with the present conditions of brake operation both in time and air consumption throughout the train.

It will be noted from the above that the present mechanism involves very little in addition to the present standard railway equipment as shown in my Patent, No. 1,612,781, and such equipment may be modified at a minimum of expense thereby to obtain among others all of the objects and advantages herein set forth.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims:

1. In an air brake system, in combination, an air brake cylinder and reservoir, an auxiliary expansion reservoir into which a portion of the air is by-passed on application of the brakes, whereby piston travel may be reduced approximately one-half without loss of effectiveness.

2. In an air brake system, in combination, an air brake cylinder having a piston for actuating the brake rigging, an air reservoir connected with the cylinder, and means whereby a portion of the air is by-passed from the reservoir to the cylinder to give normal braking pressure within the cylinder and constant short piston travel.

3. In an air brake system, in combination, an air brake cylinder having a piston for actuating the brake rigging, and an air reservoir connected with the cylinder, means whereby a portion of the air is by-passed from the reservoir to the cylinder to give normal braking pressure within the cylinder for short piston travel, said cylinder having a port in one side at the end of this normal short piston travel to permit an escape of air whenever the piston exceeds normal short piston travel.

4. In an air brake system, in combination, an air brake cylinder, a piston therein connected with the brake rigging for normal short piston travel, an air reservoir, means for diverting a portion of the air from said reservoir to the cylinder on application of the brakes, means for diverting a portion of the air from the cylinder when excess travel of the piston occurs, and means actuated by the air diverted from said cylinder for restoring the brake rigging to properly regulated condition in which brake shoe clearance is proportional to normal short piston travel.

5. In an air brake system, in combination, an air brake cylinder, a piston therein adapted normally to have short piston travel for applying the brakes, means for maintaining the brake shoes at a clearance distance proportional to this normal short piston travel, and means for preventing excessive pressure in the cylinder at short piston travel.

6. In an air brake system, in combination, an air brake cylinder, a piston therein regulated normally to have short piston travel for applying the brakes, and an auxiliary expansion reservoir into which a portion of the air for applying the brakes is diverted, thereby to prevent excessive brake pressure in the cylinder for such normal short piston travel.

7. In an air brake system, in combination, an air brake cylinder, a piston therein regulated normally to have short piston travel for applying the brakes, and an auxiliary expansion reservoir into which a portion of the air for applying the brakes is diverted, thereby to prevent excessive brake pressure in the cylinder for such normal short piston travel, the entrance port to said auxiliary expansion reservoir being restricted whereby equalization and pressure gradually takes place after braking application.

8. In an air brake system, in combination, an air brake cylinder, brake rigging including live and dead levers connected with each other and said cylinder, one of said levers having an adjustable point of support adapted to be moved on excess piston travel, said piston travel, however, being approximately half present standard piston travel, and means for diverting a part of the standard air pressure from said cylinder on application of the brakes, thereby to prevent abnormal pressure within the air brake cylinder in excess of the pressure contained in the cylinders of any other car.

9. In an air brake system, in combination, an air brake cylinder, a piston therein having normal short piston travel, live and dead levers connected with said piston, one of said levers having a variable point of support, and means whereby said point of support may be shifted manually or automatically, thereby to position the brake shoes at proper predetermined clearance proportional to normal short piston travel, and means for controlling the pressure in said cylinder for such short piston travel.

10. In an air brake system, in combination, an air brake cylinder, a piston therein having normal short piston travel, live and dead levers connected with said piston, one of said levers having a variable point of support, and an expansion reservoir adjacent the cylinder whereby a portion of the air used in applying the brakes is diverted from said cylinder to prevent excessive pressure in said cylinder by reason of its short piston travel.

11. In an air brake system, in combination, an air brake cylinder having a piston adapted to have normal short piston travel, live and dead levers at opposite ends of said cylinders and connected with each other at their central parts, one of said levers having a shiftable point of support, and an expansion reservoir adjacent the cylinder whereby a portion of the air to be used in applying the brakes is diverted from said cylinder to prevent excessive pressure in said cylinder by reason of its short piston travel.

12. In an air brake system, in combination, an air brake cylinder, a piston regulated normally to have short piston travel for applying the brakes, an auxiliary expansion reservoir into which a portion of the air for applying the brakes is diverted whereby to obtain normal air pressure within the cylinder for short piston travel, and means for cutting in and out the auxiliary expansion reservoir as and when desired.

13. In an air brake system, in combination, an air brake cylinder, a piston therein regulated normally to have short piston travel for applying the brakes, an auxiliary expansion reservoir into which a portion of the air for applying the brakes is diverted thereby to prevent excessive brake pressure in the cylinder for such normal short piston travel, and means for cutting in and out said auxiliary expansion reservoir as and when desired thereby to increase or decrease the brake power depending upon the condition of load of the car.

14. In an air brake system, in combination, an air brake cylinder, a piston therein regulated normally to have short piston travel for applying the brakes, an auxiliary expansion reservoir into which a portion of the air for applying the brakes is diverted thereby to prevent excessive brake pressure in the cylinder for such normal short piston travel, means for cutting in and out said auxiliary expansion reservoir as and when desired thereby to increase or decrease the brake power depending upon the condition of the load of the car, and means whereby a further portion of the air after applying the brakes may be diverted when excess piston travel occurs.

Signed at New York, New York, this 28th day of December, 1927.

WILLIAM H. SAUVAGE.